US008879697B2

(12) United States Patent
Klemm et al.

(10) Patent No.: US 8,879,697 B2
(45) Date of Patent: Nov. 4, 2014

(54) SYSTEM AND METHOD FOR DETERMINING CALL IMPORTANCE USING SOCIAL NETWORK CONTEXT

(75) Inventors: Reinhard Klemm, Basking Ridge, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 29 days.

(21) Appl. No.: 13/572,090

(22) Filed: Aug. 10, 2012

(65) Prior Publication Data

US 2014/0044246 A1 Feb. 13, 2014

(51) Int. Cl.
H04M 11/00 (2006.01)

(52) U.S. Cl.
USPC .................... 379/93.01; 379/266.02

(58) Field of Classification Search
CPC ............... H04M 11/062; H04M 11/06; H04L 29/06353
USPC ........................... 379/93.01, 265.09; 709/226
See application file for complete search history.

(56) References Cited

U.S. PATENT DOCUMENTS

2010/0027778 A1* 2/2010 Kumar et al. ............ 379/265.09
2010/0287281 A1* 11/2010 Tirpak ...................... 709/226

OTHER PUBLICATIONS

Mobasher et al., "Automatic personalization base on Web usage mining", Communications of the ACM, vol. 43, No. 8, pp. 142-151, Aug. 2000.
Pancake, "The ubiquitous beauty of user-aware software," Communications of the ACM. vol. 44, No. 3, pp. 130-, Mar. 2001.
Nasraoui, "World Wide Web Personalization," in Encyclopedia of Data Mining and Data Warehousing, J. Wang. Ed.: Idea Group, 2005.
Wu et al., "A Framework for Classifying Personalization Scheme Used on e-Commerce Websites," Hawaii International Conference on System Sciences, vol. 7, p. 222b, 2003.
Pierrakos et al., "Web Usage Mining as a Tool for Personalization: A Survey," User Modeling and User-Adapted Interaction, vol. 13, No. 4, pp. 311-372, 2003.
Eirinaki et al., "Web mining for web personalization," ACM Transactions on Internet Technology, vol. 3, No. 1, pp. 1-27, Feb. 2003.
Schilit et al., "Context-Aware Computing Applications," IEEE Workshop on Mobile Computing Systems and Applications, vol. 0, pp. 85-90, 1994.
Dey, "Understanding and Using Context," Personal Ubiquitous Computing, vol. 5, No. 1, pp. 4-7, Jan. 2001.
Bonnet, "Model Driven Software Personalization," in Smart Objects Conference (SOC 2003), Grenoble, France, May 15-17, 2003, pp. 114-117.

(Continued)

Primary Examiner — Fan Tsang
Assistant Examiner — Van D Huynh

(57) ABSTRACT

Disclosed herein are systems, methods, and non-transitory computer-readable storage media for determining call importance using social network context. A system can receive a call from a caller and establish the identity of the caller. The system can then retrieve a social network context associated with the caller identity from a social network and determine an importance score for the call using the social network context. Social network contexts can be derived from a social network profile, caller utterances, and a social graph. Based on the importance score, the contact center provides an appropriate level of customer service. The level of customer service a contact center provides can be based on resource availability, call type, call time, agent queue selection, offered communication modalities and customer follow-up.

21 Claims, 5 Drawing Sheets

(56) References Cited

OTHER PUBLICATIONS

Blechschmidt et al., "Personalization of End User Software on Mobile Devices," in Proceedings of the Second IEEE International Workshop on Mobile Commerce and Services, Washington, DC, USA, 2005, pp. 130-137.

Garrigos et al., "Modeling Dynamic Personalization in Web Applications," vol. 2722, pp. 3-27, 2003.

Deyoung et al., "Profiling information technology users: en route to dynamic personalization," Computers in Human Behavior, vol. 20, pp. 55-65, 2004.

Schwabe et al., "Cohesive design of personalized Web applications," IEEE Internet Computing, vol. 6, pp. 34-43, Mar./Apr. 2002.

Reichel, "XML-based Programming Language Modeling: An Approach to Software Engineering," in IASTED Conference on Software Engineering and Applications, 2004, pp. 424-429.

Tvarozek et al., "Personalized Presentation in Web-Based Information Systems," in Proceedings of the 33$^{rd}$ Conference on Current Trends in Theory and Practice of Computer Science, vol. 4362, Harrachov, Czech Republic, 2007, pp. 796-807.

Rabiser et al., "Three-Level Customization of Software Products Using a Product Line Approach," in Hawaii International Conference on System Sciences, 2009, pp. 1-10.

Vallet et al., "A Semantically-Enhanced Personalization Framework for Knowledge-Driven Media Services," in Proceedings of IADIS International Conference on WWW / Internet, Lisbon, Portugal, Oct. 2005.

Magoulas et al., "An Adaptive Fuzzy Model for Personalization with Evolvable User Profiles," in Proceedings of IEEE 2nd International Symposium on Evolving Fuzzy Systems, Ambelside, Lake District, UK, 2006, pp. 336-341.

Zimmermann, "Personalization and Context Management," User Modeling and User-Adapted Interaction, vol. 15, No. 3, pp. 275-302, 2005.

Hammer-Lahav, Internet Engineering Task Force (IETF), Request for Comments (RFC) 5849, 2010.

Dey et al., "The context toolkit: aiding the development of context-enabled applications," in *Proceedings of the SIGCHI conference on human factors in computing systems: the CHI is the limit*, Pittsburgh, Pennsylvania, United States, 1999, pp. 434-441.

"Demo: Fall 2011", http://www.demo.com/alumni/demo2011fall/250562.html, Silicon Valley, CA, 2011 p. 1.

Hardawar, Devindra, "Demo: Voyurl Mines Your Browsing History for Intriguing Analytics". http://venturebeat.com/2011/09/12/voyurl-browser-history-sharing, Sep. 12, 2011, pp. 1-5.

Newman, Jared, "Voyurl: A Cool, Creepy Way to Browse the Web", http://technologizer.com/2011/03/14/voyurl-a-cool-creepy-way-to-browse-the-web/, Mar. 14, 2011, pp. 1-8.

* cited by examiner

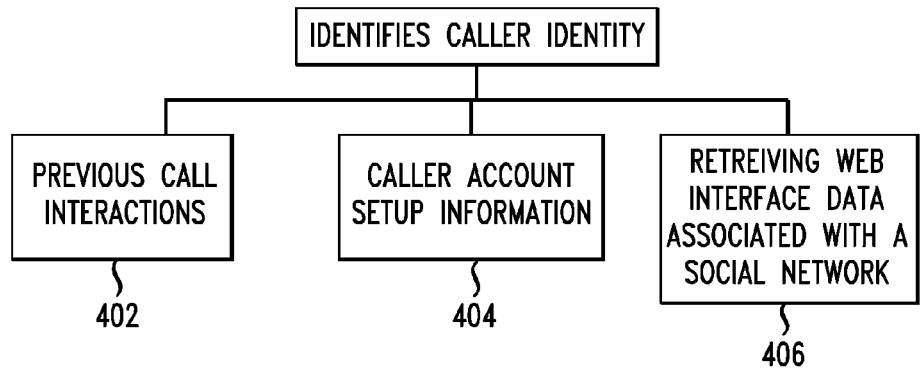
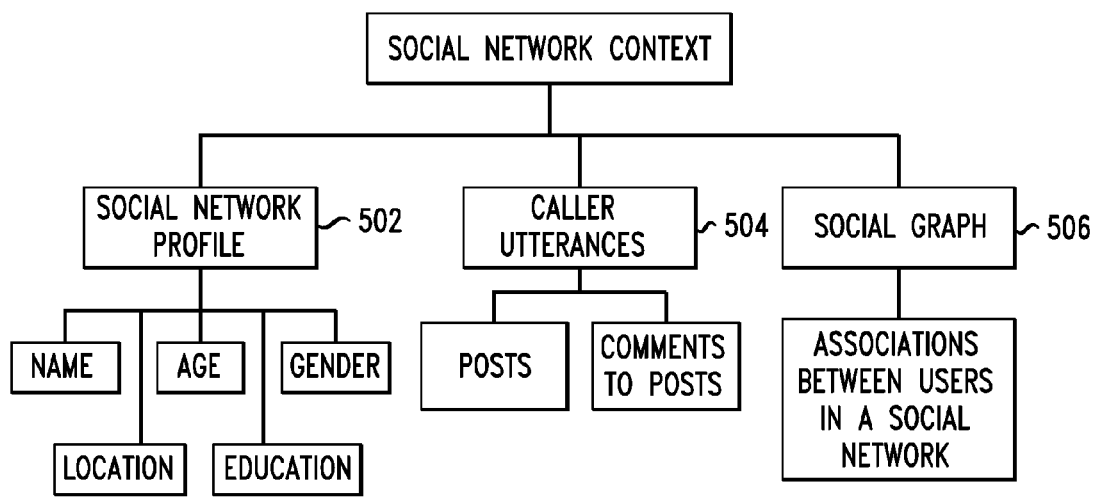

SYSTEM AND METHOD FOR DETERMINING CALL IMPORTANCE USING SOCIAL NETWORK CONTEXT

BACKGROUND

1. Technical Field

The present disclosure relates to determining the importance of a call from a caller to a call center and more specifically to computing an importance score for the call based on social network context.

2. Introduction

Contact centers provide customer service remotely to both potential and current customers of a business. Whereas classic contacts centers relied exclusively on telephones, resulting in the name 'Call Centers,' modern contact centers can connect with consumers using methods including voice calls, video calls, emails, social media messages, and instant messaging, while using equipment such as cell phones, smart phones, laptop computers, and desktop computers. The business expenses, efficiency, and perceived quality of service of a contact center can vary based on a level of service rendered to a caller. For example, providing a video link with a customer service representative based in the United States can be perceived as a higher quality than a telephone connection with a representative in a foreign country. In order to provide a service which best meets business goals, businesses can adjust the level of customer service provided according to the projected importance of a particular caller. This importance has been previously predicted using information such as caller identity and call topic.

Current, potential, or past customers contact a contact center via a voice call, video call, email, social media post, instant message, etc. Customers connecting to contact centers can use telephones, cell phones, smartphones, computers and any other device capable of communication. Contact centers can provide varying levels of service to calls made by callers depending on call importance. Classically, call importance has been based on either a call topic or a previous interaction between the call center and the customer, modeled as Customer Relationship Management (CRM) data.

In order for proper implementation of CRM, the contact center must establish the identity of the caller. Caller identity can be determined by accessing databases storing previous call interactions, previous conversations/utterances, account setup information, web interface information, phone numbers, etc. In certain cases, these databases can be public. For example, if a user is calling from a telephone into a call center, the call center can identify the caller by accessing a public list of phone numbers. In other instances, the databases can be private. For example, the call center can maintain a database recording the phone numbers of previous callers linked to the identification the previous caller provided. Alternatively, the call center can access a database maintained privately by a third party. When the connection between the caller and the contact center is a type other than a telephone call, such as an Internet connection, the identity can be determined based on IP address information contained within specific transmission packets.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for determining call importance using social network context. Determining call importance using social network context enables businesses operating contact centers to more accurately provide levels of customer service. For example, a business can provide a high level of service via a video chat between a customer considered important and a highly skilled and experienced agent in hopes that the satisfied customer will result in future business. Alternately, the business can route an unimportant call to a queue that is serviced by entry-level agents or otherwise less qualified agents, allowing the customer to wait for an available customer service agent.

The social network context of a caller can include a social network profile, a social graph, specific friends and connections, posts, and social media interactions. Contact centers can determine caller importance using social networking context in different ways based on specific business needs. For example, certain businesses can consider a caller with many contacts in a social network as important. In such a case a caller with a relatively large social network (i.e., two thousand contacts) can be considered more important than a caller with a relatively smaller social network (i.e., fifty contacts). Certain businesses can consider callers as important when those callers post comments related to technology on a social network website. For instance, a business such as Apple™ can consider a caller important that frequently posts positive comments about his iPad on a social network website such as Facebook. Other businesses can consider callers important based on a social network profile that includes user attributes such as name, age, sex, race, religion, affiliations, preferences, etc. As an example, a business related to selling concert tickets can consider callers over the age of 18 more important when that business has multiple concert bookings for Top 40's musicians. Alternatively, those callers over the age of 70 might be considered more important when older musicians are booked.

The system can determine an importance score for the call based on social network context in conjunction with optional additional information such as call topic and a customer management database entry (CRM). Additionally, the contact center can use information such as call center resource availability, call type and call time to determine a customer service level to provide. The level of customer service provided to calls can include agent queue selection, agent selection, offered communication modalities and customer follow-up. Utilizing the vast amount of data included in social network context to determine call importance in combination with CRM, call topics, and contact center availability allows for contact centers to provide more accurate levels of service to calls.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example system embodiment;
FIG. 5 illustrates an example system embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for determining call importance using social network context. A system, method and non-transitory computer-readable media are disclosed which determine call importance by generating an importance score for each call using social network context. A brief introductory description of a basic general purpose system or computing device in FIG. 1 which can be employed to practice the concepts is disclosed herein. A more detailed description of determining call importance using social network context will then follow.

Call routing based on caller identity and call topic is a known methodology used in contact centers. A contact center can route calls to call center agents based on caller identity, call topic or both. A system implementing call routing based on caller identity establishes identity through the caller's phone number or other identifiers such as account numbers, email addresses, usernames, etc. The call topic typically is determined using interactive voice response (IVR) and pull-down menus. In call routing, a system selects a skills queue and an agent for a call. This process partially determines the level of customer service rendered to a customer by the contact center. Customer service widgets and other personalized customer service applications offered through call centers include mechanisms for determining a caller's social network identity but do not use that information to estimate the importance of a call. Estimating the importance of a call using social network context can increase business revenue and decrease contact center operating expenses.

These variations shall be discussed herein as the various embodiments are set forth. The disclosure now turns to FIG. 1.

Figure 1:
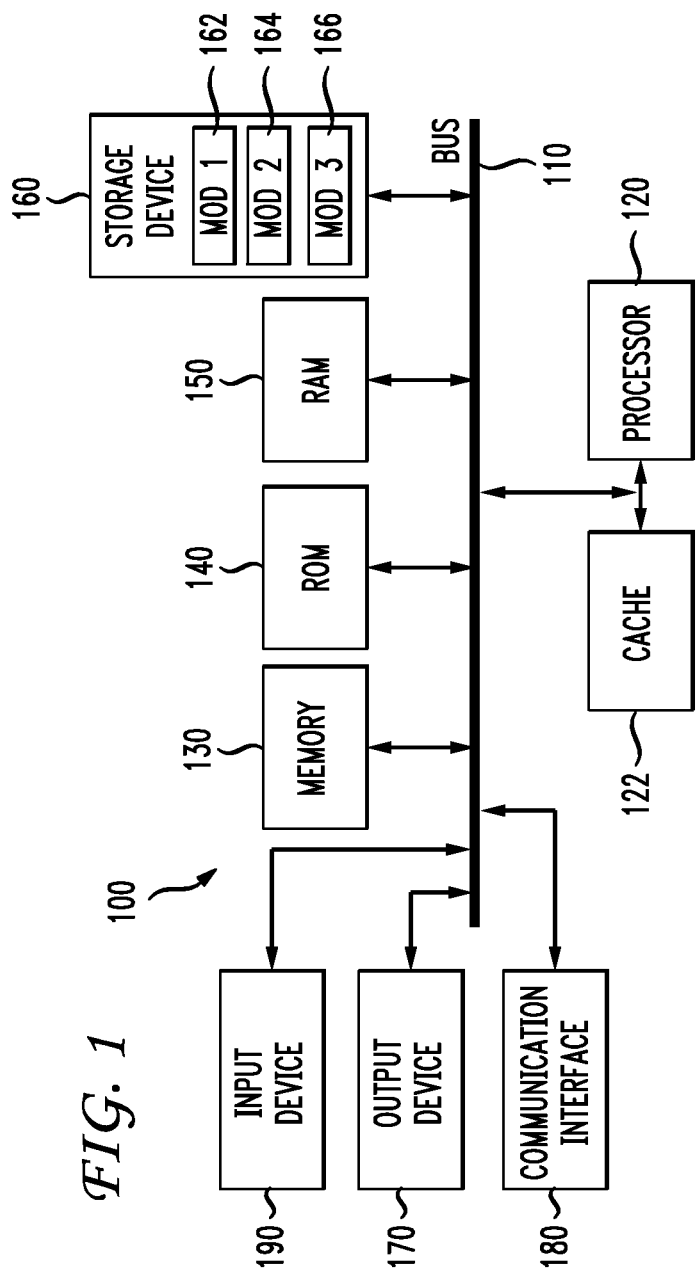
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
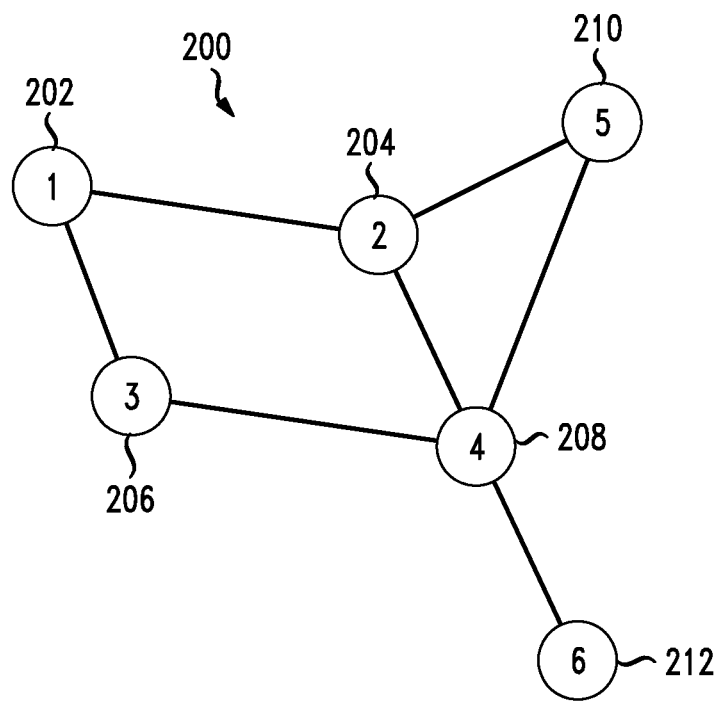
FIG. 2 illustrates a social graph.

Having disclosed some components of a computing system, the disclosure now turns to FIG. 2, which illustrates a social graph having relationships. Each person in the social graph can be represented by a numbered node and the friendship association can be illustrated by a line. Alternately, an association can indicate groupings such as family, co-workers, college roommates, high school graduates, or any type of relationship between users. For example, six people and the relationships between them are represented in FIG. 2. Users Alice, Bob, Charlie, Dan, Edward and Frank are represented by numbered nodes from one to six, respectively. Alice 202 is friends with Bob 204 and Charlie 206. Bob 204 is friends with Alice, Dan 208 and Edward 210. Charlie 206 is friends with Alice and Dan 208. Dan 208 is friends with Charlie, Bob 204, Edward 210 and Frank 212. Edward 210 is friends with Bob 204 and Dan 208, and Frank 212 is friends with Dan 208.

In accordance with this disclosure, a contact center can utilize a social graph in determining an importance score of a call. For example, because Alice 202 has an indirect relationship with an influential customer Dan 208, through Charlie 204, the contact center can rate a call from Alice higher than if she did not have a relationship with Dan at all. Dan can be considered influential because using social network context the contact center determines that every time Dan calls, 30 of his friends call within a week and purchase $1000 worth of merchandise. Alternatively, the call center can determine that despite a remote connection with Dan, calls from Alice are not considered important because the size of her social graph is relatively small. For callers having large social graphs such as 4,000 friends, the contact center can categorize the caller as a promoter having a determined importance score, not an actual friend. In one embodiment, the system 100 can utilize photos and videos to determine call importance by automatically or manually determining social associations. For example, on his own, caller Charlie 206 is considered unimportant. However if the system 100 identifies Charlie 206 in a photo posted on Alice's 202 social network website with important Bob, the system can rate Charlie as more important.

Figure 3:
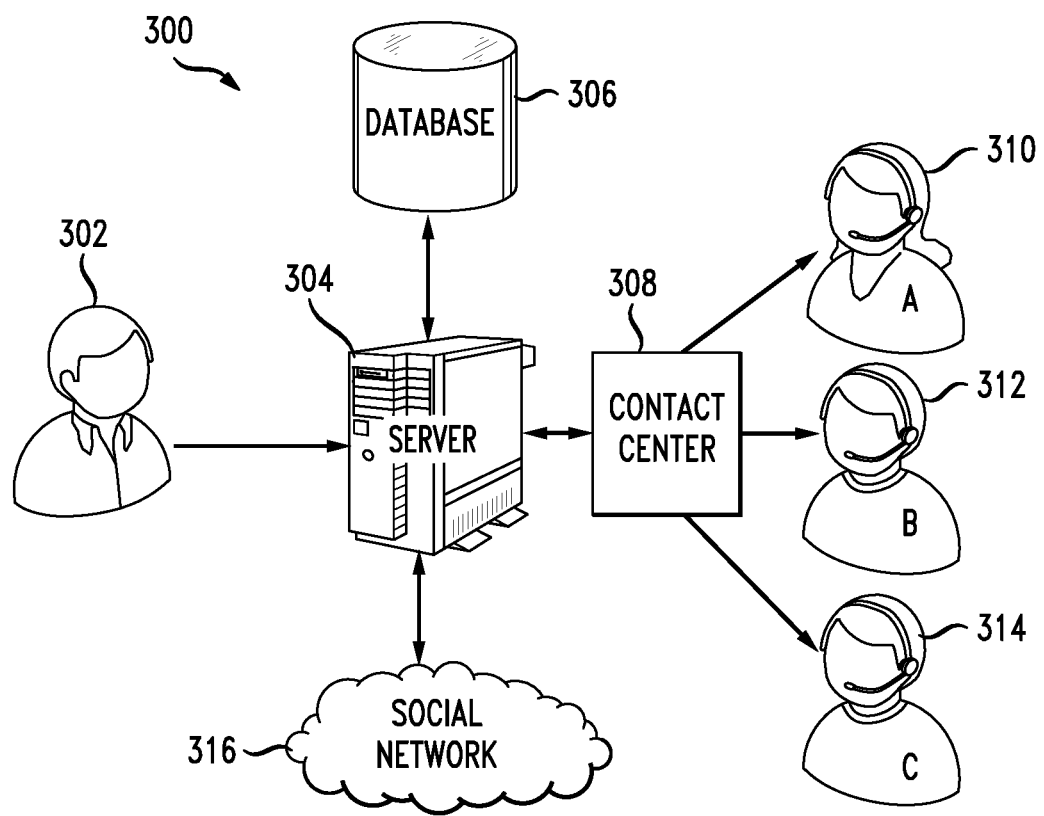
FIG. 3 illustrates an example system embodiment.

FIG. 3 illustrates an example system embodiment of determining call importance using social network context. A system 300 can include a business customer 302 having a social network 316 that desires service through a contact center 308. For example, a customer 302 purchases a computer and requires technical support during the set-up process. A contact center 308 having agents A 310, B 312 and C 314 receives a call from the customer 302 and establishes the identity of the customer by accessing, via a server 304, database 306 storing previous call interactions. The system 300 then uses this identity to retrieve a social network context from social network 316 and determines an importance score for the call based on the social network context.

Acquisition of a social network context can be performed in multiple manners. For example, a consider a caller who has previously linked her social network identity to an online account that she has with the company. The company can then retrieve the caller's social network context based on the caller's social network identity. In another example, The caller uses a customer service widget (such as an online customer service application, or a smartphone application) to contact the company. The company has integrated the widget with social networks such as Facebook, Twitter, etc. The widget is aware of the caller's identity and can retrieve the social network context based on this identity, then return the identity to the company. In yet another example, when a caller places a call into the call center, the call center identifies the caller based on the caller's phone number, IP address, MAC address associated with a computing device, or some other form of individual identification dependent on the type of call. The call center system then searches social networks for individuals who fit the profile that the company has about the caller, searching fields or categories such as name, location, language, etc. The system attempts to narrow down the search hits to exactly that caller.

The importance score can be determined exclusively from the social network context retrieved, or can be based on call history and positive comments posted by the customer on a social network website. Alternately, the system can base the importance score on call history and number of contacts in a social network. For example, if a caller 302 has a high number of contacts and calls often, that caller can receive a higher importance score. In another example, if the caller 302 has a history of finishing calls with agent A 310 in 5 minutes, but agent B 312 in 30 minutes, however agent B 312 has provided feedback stating the caller is cordial, the caller can be determined as important with respect to agent B and less important with respect to agent A. In this way, various queues or levels of importance can be determined for each agent, which can then be rearranged as required by the contact center.

After the score is determined, the system 300 provides a level of customer service to the customer 302 based on the importance score and call center resource availability. For example, the contact center 308 can immediately route the customer's call to a technical specialist A 310 because the system determines the customer is important and does not want the customer to hold for long. If the contact center were to score the call lower, the call can be placed in a general call queue that is serviced by less specialized agents B 312 and C 314 where a longer wait time is acceptable. Alternately, the contact center 300 can use an interactive voice response (IVR) system to handle calls below a determined importance threshold. In other configurations, the system 300 can forward lower-ranking callers to an automated call center having no live agents, while important calls are routed immediately to live agents. Alternatively, callers having low priority can be informed that an agent will call them back shortly, routed to agents of a foreign nationality, or placed on hold for a longer period of time.

FIG. 4 illustrates an exemplary system embodiment of identifying caller identity in determining call importance using social network context. Caller identity can be determined in different ways including accessing a database storing previous call interactions 402, accessing a database including caller account setup information 404, and retrieving web interface data associated with a social network 406. A database storing previous call interactions 402 can include information related to call history such as dates, times of calls, reasons for calls, phone numbers, usernames, email addresses, names of customer service agents that serviced calls, recommendations or advice given to callers, product return information, length of calls, frequency of calls, call modalities, caller feedback, and the agents with whom the caller interacted. For example, the database can store a record of caller John calling the contact center on May 1, 2012 at 4:55 PM to receive assistance installing a hard drive he purchased. The record can indicate the call was a telephone call that lasted 15 minutes and that the customer service agent successfully walked him through the installation process.

A database storing caller account setup information can include information pertaining to a caller account such as name, home address, phone number, email address, user name, length of time the account has been open, credit card information, and social network information. As the caller contacts the contact center, the contact center can access this database to determine the identity of the caller. Alternatively, the contact center can access public information, such as public telephone records, to determine the identity of the caller. The call center can then use the database of stored information to match the caller with previously obtained information. In addition, identifying caller identity can be determined by retrieving web interface data associated with a social network such as through Facebook Connect. Retrieving web interface data associated with a social network allows users to connect their identity information from the social network website to third party websites, desktop and mobile applications. The system 100 can retrieve identity information such as profile, friends, photos, groups, etc. from a social network website to determine caller identity.

After the system 100 determines the identity of the caller, the system retrieves a social network context associated with the identity of the caller. FIG. 5 illustrates an example system embodiment of a social network context. A social network context can include a social network profile 502, caller utterances 504 and a social graph 506. A social network profile can include information such as caller name, age, gender, home location, work location, education level, education location, email address, username, marriage status, race, religion, preferences, apps, games, pictures, or any other information about a user in a social network. Caller utterances can include information about posts made to a social network website such as frequency of posts, time of posts, associations between posts, mood of posts, etc. Caller utterances can also include information about comments a user made to other posts which can include the comment, time of comment, likes or dislikes of comments and other related comments to the same post. For example, a caller utterance can include the following comment made by a user "Rebooting my computer . . . again" or a comment such as "Loving the sunshine today!" Additionally, a comment made to an existing post such as "Thanks, Abby can't wait to see you too" can be considered a caller utterance. Any remark or comment issued by the caller on a social network website can be considered caller utterance.

The third component of social network context is a social graph that includes associations between users in a social network. A social graph describes relationships between users online and can include contacts such as friends, family and co-workers. For example, a social graph of caller Edward can include 100 friends grouped into the following groups: close friends, family, high school and college. An alternate social graph of caller Jane can include 15 friends grouped into church and school.

Figure 6:
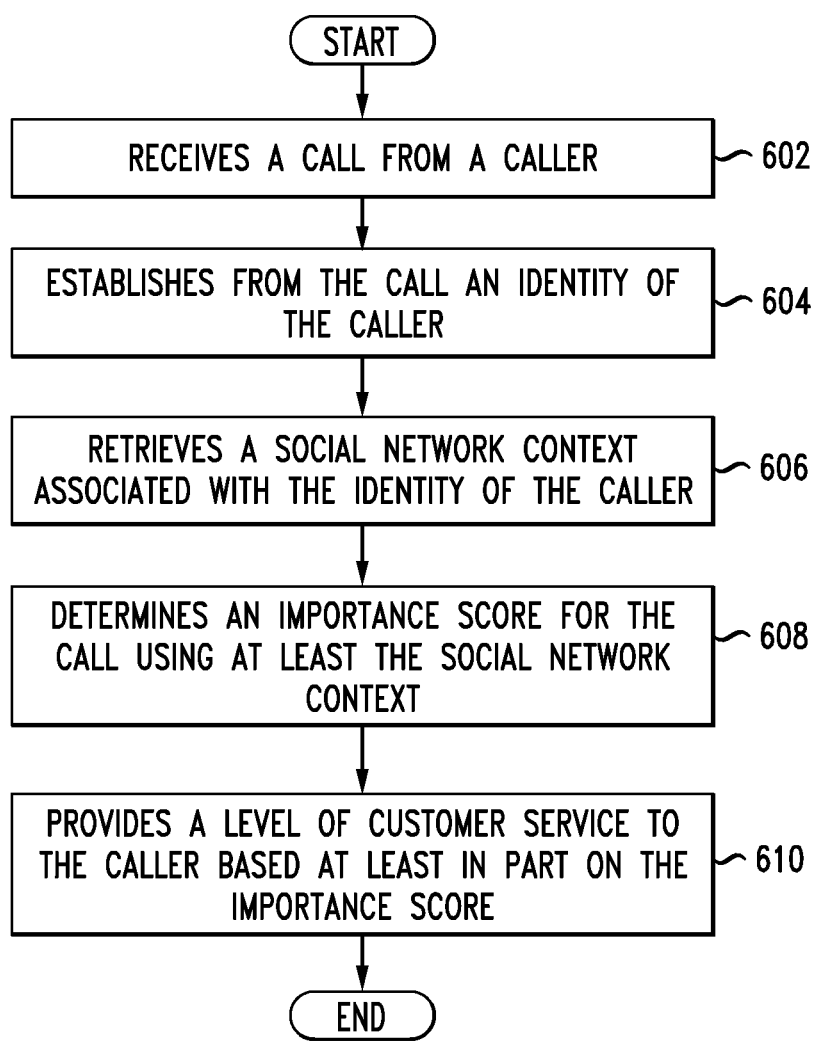
FIG. 6 illustrates an example method embodiment.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

FIG. 6 illustrates an exemplary method embodiment of determining call importance using social network context. A system 100 implementing the method at a contact center operated by a business receives a call from a caller (602). A call can be any type of communication between a customer and the business, including emails, voice communications, facsimile, video communication, instant messaging, or even holograms. A caller can be a former, current, or potential customer of the business having the potential to increase business revenue or decrease business costs. If the contact center is not associated with a business, the caller can be anyone coming in contact through an allocated means for communicating with the contact center. For example, if the contact center is affiliated with a political campaign, anyone communicating with the contact center could be considered a caller.

Contact centers can be run by anyone with a need to contact, or be contacted by, individuals of the general populace. Communications between the callers and the contact center can be accomplished using any one of a multitude of communication modalities including phone calls, video chats, emails, text messages, etc. using touch-tone phones, smart phones, laptops, desktop computers and any other device capable of communication.

After the contact center receives a call from a caller (602), the system 100 establishes from the call an identity of the caller (604) using previous call interactions, caller account setup information and retrieving web interface data associated with a social network. For example, the system 100 can determine the identity of the caller using a phone number associated with the caller. The system 100 can then access a database of account setup information in which the caller had previously provided information concerning access of a social network. Examples of such a social network include Facebook, Google+, Instagram, MySpace, Twitter, LinkedIn, etc. Alternatively, the caller grants social network access upon calling into the contact center. Then the system retrieves a social network context associated with the identity of the caller (606) by accessing the specified social network or networks using the information provided by the caller. This social network context can be a fact or interpretation from the social network which will allow the call center to make determinations about the caller. For instance, the social network context for a business might be the number of product related posts found on the social network of the caller. Alternatively, the social network context could be the number of followers the caller has, the number of friends, a number of pictures, the locations of those pictures, music, specific applications loaded, the number of recommendations previously made, and/or shared items posted.

After the system 100 retrieves a social network context associated with the caller identity (606), the system 100 determines an importance score for the call using at least the social network context (608). In addition to the social network context, the system 100 can use call topic and information found in a Customer Relationship Management (CRM) database to determine an importance score. A CRM database of a business can contain information concerning previous caller interactions with the call center. For example, the database can have a record of previous agent's feedback on the caller, how much of a product he purchased, if a follow-up call was necessary, attitude of the caller, feelings or notes of the agent on the previous call, and if any previous calls were dropped mid-call.

The algorithm that the system 100 uses to determine a score and the weights each factor carries can change depending on call center resource availability, call type and call time. For example, during peak hours, a contact center can give calls pertaining to purchases a high importance score, while calls pertaining to returns could be given a lower importance score. Alternately, during off-peak hours the contact center scores all calls the same because there is less demand for resources. Another example illustrates an algorithm utilized in the computation of an importance score. For example, the factors used in computing a score are weighted as follows: call topic 20%, social network context 50% and CRM entry 30%. The system can rate each factor on a scale of one to ten and multiply the rating by its respective weight, then adding the results to determine an importance score. For example, a contact center receives a call pertaining to returning a product. At the time of the call, the contact center scores call topic a 5 and CRM entry 6 because there is call history available for the caller. Social network context receives a score of 8 because the caller has influential friends determined by examining the caller's social graph. The overall total importance score on a scale of one to ten is:

$$5*0.20+8*0.50+6*0.30=6.8$$

Determining the social network context score, the call topic score, or the value of CRM entries depends on the particular goals of the call center. For example, if a call center places a priority on wealthy friends, and multiple photographs are detected on Facebook or Instagram containing the caller and a celebrity, that caller's social network context score will be higher than someone who only have photographs with their dog. However, if the call center places a priority on animal compassion, the caller having multiple photographs with their dog will be placed at a higher priority. Likewise, if a user receives multiple tweets on Twitter from known Twitter accounts of influential people, that user can have a high social network context score. If, however, the user sends out a great deal of tweets everyday, that user many be interpreted to be a spammer or an advertiser, and receive a social network context score in accordance with that designation. Friends, photographs, people in one's photographs, applications, games, connections, and activity level are just examples of how a contact center can extract a social context score, which can then be used with other desired factors to determine the importance score.

Once the importance score is determined, the contact center provides a level of customer service to the caller based at least in part on the importance score (610). The level of customer service can be based on call center resource availability, call type, call time, agent queue selection, agent selection, offered communication modalities and customer follow-up. A contact center can assign customer service agents to handle calls having importance scores within a determined range. For example, contact center agents can be tiered according to importance level. Alternatively, contact center agents can have areas of specialty. In addition, contact centers can assign calls to particular queues of customer service agents, where each agent has more than one queue. For example, agent A can have three queues organized by call topic. The system 100 can organize each of these queues by caller importance scores. In addition to agent selection, offered communication modalities can vary depending on call importance. Offered communication modalities can include voice, email, texts, chats and video. For an important call, the contact center can offer a video chat with a technical specialist to aid a customer. In the case of a customer service representative chatting via video, the video connection can allow the specialist to physically show the customer how to configure equipment, which can decrease business costs if the customer's problems are solved while chatting via video rather than sending a technician to the customer's house. Determining call importance using social network context enables contact centers to provide levels of customer service based on the importance of a call more accurately than only using call history and call topic because social network context encompasses a broad range of information about a user that has not traditionally been available.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can apply to determining importance of a user, photo, or video utilizing social network context. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving a call from a caller;
establishing from the call an identity of the caller;
retrieving a social network context associated with the identity of the caller;
identifying a topic of the call;
retrieving customer relationship information pertaining to a previous interaction with the caller;
determining an importance score for the call by assigning respective weights to the social network context, the topic, and the customer relationship information, a proportional distribution of the respective weights being based on one of resource availability, a call type, or a call time; and
providing a level of customer service to the caller based on the importance score.

2. The method of claim 1, wherein establishing the identity comprises one of accessing a previous call interaction, accessing account setup information, and retrieving web interface data associated with the social network.

3. The method of claim 1, wherein the social network context is based on one of a social network profile, a caller utterance, or a social graph.

4. The method of claim 3, wherein fields of the social network profile comprise one of a name, a username, an age, a gender, a physical location, an education level, an education location, an email address, a marriage status, a race, a religion, an app, a game, a picture, a profession, a language, a hobby, a preference, an activity, and an affiliation.

5. The method of claim 3, wherein the caller utterance comprises one of a post or a comment to a post.

6. The method of claim 3, wherein the social graph comprises an association between users in the social network.

7. The method of claim 1, wherein the social network context indicates how influential the caller is in a social network associated with the caller.

8. The method of claim 1, wherein the level of customer service is provided further based on one of the resource availability, the call type, and the call time.

9. The method of claim 1, wherein the level of customer service comprises one of agent queue selection, agent selection, offered communication modalities, or customer follow-up.

10. The method of claim 9, wherein the offered communication modalities comprise one of voice call, video call, email, or instant messaging.

11. A system comprising:
a processor; and
a computer-readable storage medium storing instructions which, when executed by the processor, cause the processor to perform operations comprising:
receiving a call from a caller;
identifying from the call an identity of the caller;
retrieving a social network context associated with the identity of the caller;
identifying a topic of the call;
retrieving customer relationship information pertaining to a previous interaction with the caller;
determining an importance score for the call by assigning respective weights to the social network context, the topic, and the customer relationship information, a proportional distribution of the respective weights being based on one of resource availability, a call type, or a call time; and
providing a level of customer service to the caller based on the importance score.

12. The system of claim 11, wherein identifying the identity comprises one of accessing a previous call interaction, accessing caller account setup information, and retrieving web interface data associated with the social network.

13. The system of claim 11, wherein the social network context is based on one of a social network profile, a caller utterance, and a social graph.

14. The system of claim 13, wherein fields of the social network profile comprise one of a name, a username, an age, a gender, a physical location, an education level, an education location, an email address, a marriage status, a race, a religion, an app, a game, a picture, a profession, a language, a hobby, a preference, an activity, and an affiliation.

15. A computer-readable storage device storing instructions which, when executed by a processor, cause the processor to perform operations comprising:
receiving a call from a caller;
identifying from the call an identity of the caller;
retrieving a social network context associated with the identity of the caller;
identifying a topic of the call;
retrieving customer relationship information pertaining to a previous interaction with the caller;
determining an importance score for the call by assigning respective weights to the social network context, the topic, and the customer relationship information, a proportional distribution of the respective weights being based on one of resource availability, a call type, or a call time; and
providing a level of customer service to the caller based on the importance score.

16. The computer-readable storage device of claim 15, wherein the social network context is based on one of a social network profile, a caller utterance, or a social graph.

17. The computer-readable storage device of claim 16, wherein the caller utterance comprises one of a post or a comment to a post.

18. The computer-readable storage device of claim 16, wherein the social graph comprises an association between users in the social network.

19. The computer-readable storage device of claim 15, wherein the social network context indicates how influential the caller is in a social network associated with the caller.

20. The computer-readable storage device of claim 15, wherein the level of customer service is provided further based on one of the resource availability, the call type, or the call time.

21. The method of claim 1, wherein the level of customer service relates to an amount of customer service resources to be used to assist the caller.

\* \* \* \* \*